United States Patent
Akatsu et al.

(10) Patent No.: US 6,378,000 B1
(45) Date of Patent: Apr. 23, 2002

(54) ADDRESS MAPPING IN HOME ENTERTAINMENT NETWORK

(75) Inventors: Shinji Akatsu, Kanagawa (JP); Fernando Masami Matsubara, Santa Clara, CA (US); Shin Miura, Kanagawa (JP)

(73) Assignee: Mitsubish Electric Research Laboratories, INC, Cambridge, MA (US)

( * ) Notice: Subject to any disclaimer, the term of this patent is extended or adjusted under 35 U.S.C. 154(b) by 0 days.

(21) Appl. No.: 09/304,212

(22) Filed: Apr. 29, 1999

(51) Int. Cl.$^7$ ............................................. G06F 15/16
(52) U.S. Cl. ...................... 709/245; 709/221; 709/222
(58) Field of Search ................... 709/245, 220, 709/221, 222, 224; 707/102, 509; 711/202, 205, 221; 710/107, 129, 130

(56) References Cited

U.S. PATENT DOCUMENTS

| | | | |
|---|---|---|---|
| 4,423,414 A | 12/1983 | Bryant et al. | 340/825.07 |
| 4,644,468 A | 2/1987 | Doster et al. | 364/200 |
| 4,677,588 A | 6/1987 | Benjamin et al. | 364/900 |
| 4,800,384 A | 1/1989 | Snijders | 340/825.52 |
| 5,086,385 A | 2/1992 | Launey et al. | 364/188 |
| 5,195,092 A | 3/1993 | Wilson et al. | 370/94.2 |
| 5,224,205 A | 6/1993 | Dinkin et al. | 395/200 |
| 5,283,819 A | 2/1994 | Glick et al. | 379/90 |
| 5,289,461 A | 2/1994 | de Nijs | 370/58.1 |
| 5,325,423 A | 6/1994 | Lewis | 379/90 |
| 5,341,374 A | 8/1994 | Lewen et al. | 370/85.4 |
| 5,371,852 A | 12/1994 | Attanasio et al. | 395/200 |

(List continued on next page.)

FOREIGN PATENT DOCUMENTS

| | | | |
|---|---|---|---|
| EP | 0 833 514 A2 | 4/1988 | H04N/7/24 |
| EP | 0 756 276 A1 | 1/1997 | G11B/15/087 |
| EP | 0 762 684 A2 | 3/1997 | H04H/5/00 |
| EP | 0 812 091 A2 | 4/1997 | H04L/29/06 |
| EP | 0 782 332 A2 | 7/1997 | H04N/5/44 |
| EP | 0 808 061 A2 | 11/1997 | H04N/7/01 |
| EP | 0 812 092 A2 | 12/1997 | H04L/29/06 |

(List continued on next page.)

OTHER PUBLICATIONS

IEEE Standard for a High Performance Serial Bus, IEEE Computer Society, The Institute of Electronics Engineers, Inc., 345 East 47th Street, New York, NY 10017–2394, USA, ISBN 1–55937–583–3, pp.iii–11, pp. 19–47, pp. 137–172, pp. 173–198, pp. 199–242, Aug. 30, 1996.

Sedgwick, John, "The Complexity Problem; Industrial Design", Information Access Company, a Thomson Corporation Co., ASAP, The Atlantic, vol. 271, No. 3, p. 96, Mar. 1993.

(List continued on next page.)

*Primary Examiner*—Mehmet B. Geckil
(74) *Attorney, Agent, or Firm*—Dirk Brinkman; Andrew J. Curtin

(57) ABSTRACT

A method for address mapping in a home entertainment network system includes receiving a self identification packet; extracting a bus identifier and a physical identifier from the self identification packet; adding a new row to an address mapping table, the new row comprising a bus identifier field, a physical identifier field, and a node unique identifier field; inserting the physical identifier and bus identifier into the respective bus identifier and physical identifier field in the new row of the address mapping table; transmitting a read request packet to a node identified by the self identification packet; receiving a read response packet, the read response packet comprising a node unique identifier; extracting one or more identifiers from the read response packet, the one or more identifiers including a node unique identifier; and inserting the one or more identifiers into additional fields in the new row of the address mapping table.

8 Claims, 14 Drawing Sheets

U.S. PATENT DOCUMENTS

| | | | |
|---|---|---|---|
| 5,408,619 A | 4/1995 | Oran | 395/325 |
| 5,412,720 A | 5/1995 | Hoarty | 380/15 |
| 5,434,914 A | 7/1995 | Fraser | 379/219 |
| 5,434,974 A | 7/1995 | Loucks et al. | 395/200 |
| 5,442,630 A | 8/1995 | Gagliardi et al. | 379/90 |
| 5,463,736 A | 10/1995 | Elko et al. | 395/848 |
| 5,493,638 A | 2/1996 | Hooper et al. | 395/135 |
| 5,515,511 A | 5/1996 | Nguyen et al. | 395/200.2 |
| 5,517,618 A | 5/1996 | Wada et al. | 395/200.15 |
| 5,528,507 A | 6/1996 | McNamara et al. | 364/483 |
| 5,546,549 A | 8/1996 | Barrett et al. | 395/200.06 |
| 5,561,709 A | 10/1996 | Remillard | 379/96 |
| 5,579,308 A | 11/1996 | Humpleman | 370/58.1 |
| 5,579,486 A | 11/1996 | Oprescu et al. | 395/200.15 |
| 5,581,461 A | 12/1996 | Coll et al. | 395/205 |
| 5,586,261 A | 12/1996 | Brooks et al. | 395/200.02 |
| 5,608,447 A | 3/1997 | Farry et al. | 348/7 |
| 5,617,539 A | 4/1997 | Ludwig et al. | 395/200.02 |
| 5,634,010 A | 5/1997 | Ciscon et al. | 395/200.15 |
| 5,675,390 A | 10/1997 | Schindler et al. | 348/552 |
| 5,689,641 A | 11/1997 | Ludwig et al. | 395/200.02 |
| 5,694,334 A | 12/1997 | Donahue et al. | 364/514 R |
| 5,712,688 A | 1/1998 | Eglit | 348/510 |
| 5,722,041 A | 2/1998 | Freadman | 455/6.3 |
| 5,724,106 A | 3/1998 | Autry et al. | 348/734 |
| 5,729,689 A | 3/1998 | Allard et al. | 395/200.58 |
| 5,734,589 A | 3/1998 | Kostreski et al. | 364/514 A |
| 5,745,909 A | 4/1998 | Perlman et al. | 707/513 |
| 5,752,246 A | 5/1998 | Rogers et al. | 707/10 |
| 5,754,548 A | 5/1998 | Hoekstra et al. | 370/402 |
| 5,758,084 A | 5/1998 | Silverstein et al. | 395/200.58 |
| 6,131,119 A * | 10/2000 | Fukui | 709/224 |
| 6,219,697 B1 * | 4/2001 | Lawande et al. | 709/221 |
| 6,275,889 B1 * | 8/2001 | Saito | 710/129 |
| 6,311,243 B1 * | 10/2001 | Hamamoto et al. | 710/107 |

FOREIGN PATENT DOCUMENTS

| | | | | |
|---|---|---|---|---|
| EP | 0 833 485 A1 | 1/1998 | | H04L/29/00 |
| EP | 0 825 783 A2 | 2/1998 | | H04N/7/52 |
| EP | 0 825 784 A2 | 2/1998 | | H04N/7/52 |
| EP | 0 827 062 A1 | 4/1998 | | G06F/1/32 |
| EP | 0 834 815 A2 | 4/1998 | | G06F/13/42 |
| EP | 0 835 029 A2 | 4/1998 | | H04N/7/24 |
| EP | 0 838 926 A2 | 4/1998 | | H04L/12/64 |
| EP | 0 841 776 A1 | 5/1998 | | H04L/12/28 |
| EP | 0 841 833 A2 | 5/1998 | | H04Q/11/04 |
| EP | 0 843 482 A2 | 5/1998 | | H04N/7/24 |
| EP | 0 848 568 A1 | 6/1998 | | H04Q/11/00 |
| EP | 0 849 884 A1 | 6/1998 | | H04B/1/20 |
| EP | 0 849 913 A2 | 6/1998 | | H04L/12/28 |
| EP | 0 853 398 A2 | 7/1998 | | H04L/12/21 |
| EP | 0 859 306 A2 | 8/1998 | | G06F/3/00 |
| EP | 0 859 322 A2 | 8/1998 | | G06F/13/42 |
| EP | 0 862 303 A2 | 9/1998 | | H04L/29/06 |
| EP | 0 864 984 A2 | 9/1998 | | G06F/13/00 |
| JP | WO 97/38513 | 10/1997 | | H04L/29/06 |
| JP | WO 98/04068 | 1/1998 | | H04L/12/40 |
| WO | WO 97/09800 | 3/1997 | | H04L/12/280 |
| WO | WO 97/28504 | 8/1997 | | G06F/13/10 |
| WO | WO 97/33230 | 9/1997 | | G06F/13/12 |
| WO | WO98/11685 | 3/1998 | | H04H/1/02 |
| WO | WO98/11726 | 3/1998 | | H04N/7/18 |

OTHER PUBLICATIONS

Burton, Larry, et al., The Residential Gateway, XP 000620803; 1996 Annual Review of Communications, pp. 457–467, 1996.

Elrich, David, "Firewire: The Next Connection," Popular Science, pp. 84–87, Jan. 1998.

DiGirolamo, Joel A., et al., "The VESA Home Network, A White Paper", digirol@lexmark.com, Lexmark International, Inc., pp. 1–10, before 1998.

"Full Service Access Networks (FSAN) Documents", Eighth International Workshop (http://www.labs.bt.com/profsoc/access), ATLANTA Version 2, pp. 1–24, 1997.

"The Residential Gateway, Functional Specifications," 24 pp., http://into.gte.com.

* cited by examiner

ADDRESS MAPPING IN HOME ENTERTAINMENT NETWORK

BACKGROUND OF THE INVENTION

1. Cross Reference to Related Applications

This application is related to abandoned U.S. application Ser. No. 09/140,899, filed Aug. 25, 1998, entitled "BITMAP TRANSFER IN PLUG AND PLAY NETWORK" abandoned, U.S. application Ser. No. 09/144,678, filed Aug. 31, 1998, entitled "HOME DIGITAL NETWORK INTERFACE", and pending U.S. application Ser. Nos. 09/304,212, entitled "HOME GATEWAY", Ser. No. 09/304,213, entitled "REMOTE MONITORING AND CONTROL", Ser. No. 09/302,023, entitled "GEOGRAPHIC DATA COLLECTION", Ser. No. 09/303,100, entitled "COMMAND AND CONTROL TRANSFER", and Ser. No. 09/302,022, entitled "BITMAP TRANSFER", all filed on Apr. 29, 1999, and all of which are incorporated herein by reference in their entirety.

2. Field of the Invention

The present invention pertains generally to the field of home entertainment systems, and more specifically to communication and control technologies in home entertainment systems.

BACKGROUND

In the past, a home entertainment system frequently consisted of simply a television set (TV) and a video cassette recorder (VCR). One or two coaxial or composite cables interconnected the TV and VCR from input-to-output and/or output-to-input respectively. However, in recent years, home entertainment systems have become increasingly complex.

Advances in home electronic devices, such as the compact disk (CD) player, digital-video disc (DVD) player, gaming systems, surround sound audio systems, hand held video cameras, etc., naturally compelled consumers to connect the additional devices to their home entertainment system. Each new device added at least two more wires (generally, power and input/output) to the complex web of wires snaking their way in and out of the various devices.

Originally, switch boxes were employed to cut down on the complexity of the interconnections between the various devices. For example, a simple "A/B" switch box allowed a user to selectively choose one input or another, without having to disconnect and re-engage coaxial cables between the devices. As the number of devices in home entertainment systems increased, however, the use of A/B switch boxes to interconnect the devices becomes cumbersome and inefficient.

Notably, consumers generally desire less wires, simpler interconnect schemes and, as the functionality and sophistication of home entertainment devices increase, to dispose of the myriad individual component remote controls needed to operate the respective devices. Indeed, most remote control "features" are never used (see, e.g., "The Complexity Problem: Industrial Design", Atlantic Monthly, Vol. 271, No. 3, March 1993, p. 96); if for no other reason, this is due to the differing sequences and/or number of steps involved with the control and operation of each respective device.

One solution to the aforementioned control problem is proposed in U.S. Pat. No. 5,675,390 (the "'390 patent") by Schindler et al. As depicted in FIG. 1 of the '390 patent, an entertainment system is centrally controlled by a personal computer. According to the Schindler et al. system, control is consolidated in the personal computer, wherein a "hub and spoke", or "star" type communication topology is employed - - - i.e., with all communications passing through the personal computer (or hub). By this configuration, each device requires its own dedicated connection to the personal computer. Such a solution may work well for tightly integrated home electronics equipment and a sophisticated computer user. However, it requires an even greater number of interconnecting wires than were previously employed. (Note the number of I/O plugs depicted in FIG. 7 of the '390 patent). Further, such a system is not scalable. That is, as new devices are to be added to the system, additional corresponding adapters/controllers must be added to the personal computer.

A similar solution is proposed in U.S. Pat. No. 5,722,041 (the "'041 patent") by Freadman. FIG. 2 of the '041 patent best depicts Freadman's home entertainment system. Like Schindler et al., control is centrally located in a personal computer. Media feeds are through a combination multichannel modem and analog radio frequency mixer, which connects to a number of terminal devices through a coaxial cable. Although a reduction in the number of wires is accomplished, shared functionality between the devices is minimal, e.g., one device doesn't control another device and vice-versa.

In particular, adding a user-operated personal computer to control a home entertainment system network does not, in itself, reduce complexity. In fact, it may increase the complexity. The computer is often difficult, if not cumbersome to control. Hardware and software components generally need to be configured to communicate, and the devices properly initialized. Upgrades to either peripheral devices (e.g., VCRs, TVs, etc.) or the computer itself may necessitate a complete overhaul of the system operating software, thereby introducing incompatibilities and uncertainties in the system performance.

With regard to the myriad interconnection wires in more complex home entertainment systems, one solution is the IEEE 1394-1995 standard and its extensions IEEE 1394a, and IEEE 1394b, which are referred to herein as "IEEE 1394". In one embodiment, a IEEE 1394 cable is a six strand cable: one strand for power, one strand for ground, two strands for data, and two strands for strobes used to synchronize the data strands. In an alternative embodiment, a four strand cable can be used, omitting the power and ground strands. IEEE 1394 cable also comprises a shield, which prevents electromagnetic interference. At its core, IEEE 1394 cable is essentially a high performance serial bus, having data rates as of this present writing of up to 400 megabits per second.

Advantageously, the IEEE 1394 bus reduces the need for the myriad wires in a home entertainment system, as the component electronic devices may be designed to receive power and communication through the IEEE 1394 cable, thereby reducing the connections needed for most devices to as few as a single cable in a backplane bus environment. The IEEE 1394-1995 standard provides a specification for aspects of the physical, link and transaction layers for implementing of the IEEE 1394 bus, including provisions for such functions as resetting the bus, bus arbitration, node configuration, standard packet structures, initializing packet transmission, sending and receiving asynchronous packets, sending and receiving isochronous packets, transaction control, and error detection and correction.

Communication over IEEE 1394 bus differs from many previous technologies in that it is purely digital. In particular, data carried on the IEEE 1394 bus is either digital from the source (e.g., a CD-ROM), or it must be converted by an analog-to-digital converter before being placed on the IEEE 1394 bus. Further, communication in a IEEE 1394-based system is peer-to-peer, i.e., each device (a.k.a. "node") on the IEEE 1394 bus can communicate with any other node without requiring communication/control requests to be processed through a central device/node (e.g., as is required in a "client-server" type configuration). In a IEEE 1394-based system, the controller can reside in any node, so in a sense, the IEEE 1394 bus itself becomes the controller.

Challenges for proponents of IEEE 1394 been not been so much at the lower layers of operation, that is in the physical, link and transaction layers (although bridges between protocols and data packet structure continue to be areas of contention), but rather in the high layers of the network protocol stack, such as the application layer. Recent developments in the broadcast television and cable industries, such as high definition television (HDTV) and consolidation in the cable broadcast industry are exponentially expanding the number of services and content available to consumers. To this end, interoperability between home electronic devices is strongly desired, as are common and/or standard functionality, ease of use and scalability. As such, there is a need for a system to control and manage the expanding array of devices and services that can be connected and supported, respectively, in a IEEE 1394-based home entertainment system.

SUMMARY OF THE INVENTION

In accordance with a first aspect of the present invention, a method is provided for address mapping in a network, such as, e.g., an IEEE 1394 based home entertainment network, which includes receiving a self identification packet;

extracting a bus identifier and a physical identifier from the self identification packet;

adding a new row to an address mapping table, the new row comprising a bus identifier field, a physical identifier field, and a node unique identifier field;

inserting the physical identifier and bus identifier into the respective bus identifier and physical identifier field in the new row of the address mapping table;

transmitting a read request packet to a node identified by the self identification packet;

receiving a read response packet, the read response packet comprising a node unique identifier;

extracting one or more identifiers from the read response packet, the one or more identifiers including a node unique identifier; and inserting the one or more identifiers into additional fields in the new row of the address mapping table.

As will be apparent to those skilled in the art, other and further aspects and advantages of the present invention will appear hereinafter.

BRIEF DESCRIPTION OF THE DRAWINGS

Preferred embodiments of the present invention are illustrated by way of example, and not by way of limitation, in the figures of the accompanying drawings, in which like reference numerals refer to like components, and in which.

DETAILED DESCRIPTION OF THE PREFERRED EMBODIMENTS

The IEEE 1394-1995 standard, which is hereby fully incorporated herein by reference for all that it describes and teaches, provides background information for the following description and figures in the accompanying drawings. In particular, selected portions of the IEEE 1394-1995 standard are described with reference to FIGS. 1 through 4.

IEEE 1394 OVERVIEW

Figure 1:
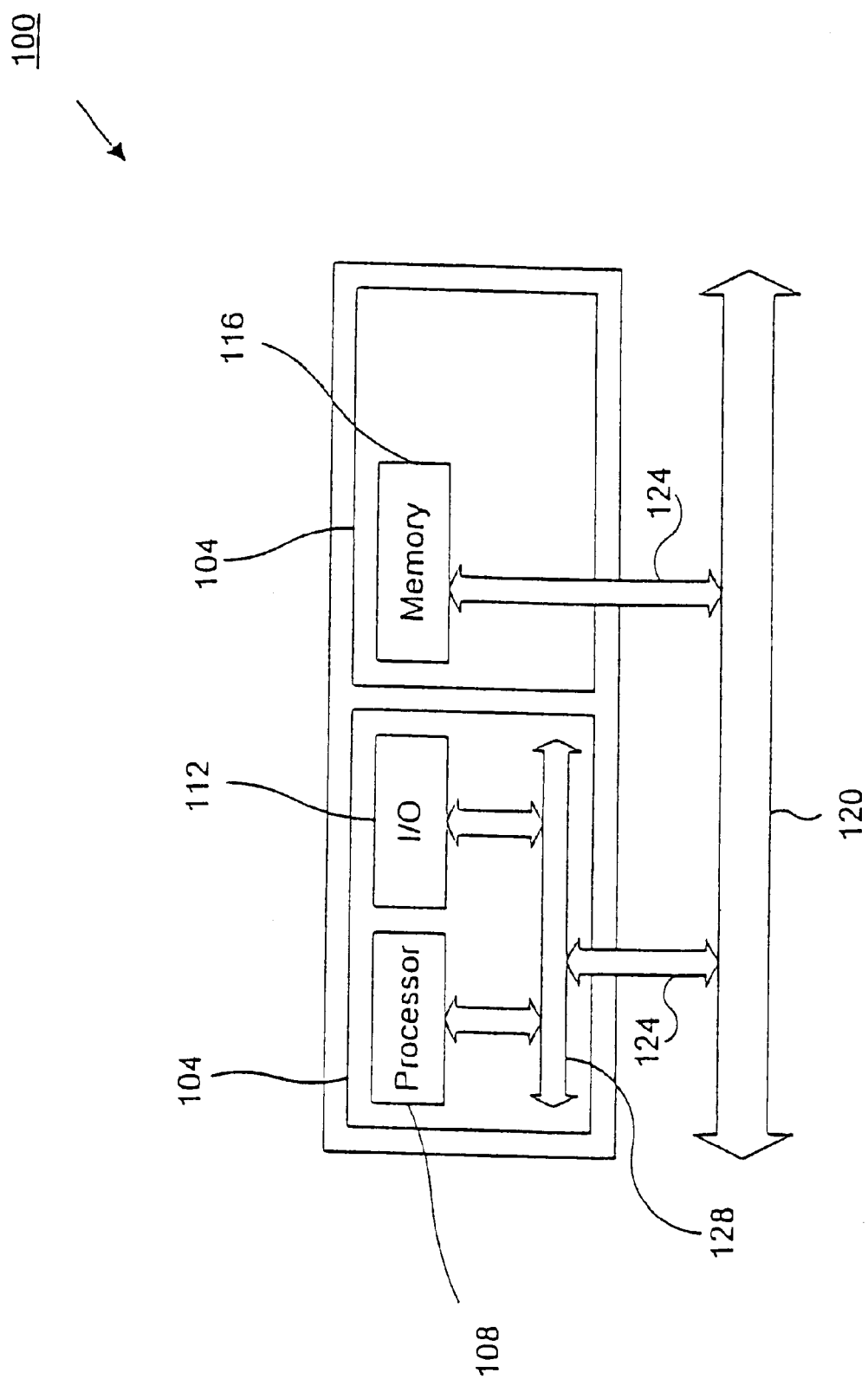
FIG. 1 depicts an exemplary IEEE 1394 module architecture.

FIG. 1 depicts an exemplary IEEE 1394 module 100, which comprises a plurality of addressable nodes 104. Each node 104 may comprise a processor unit 108 and an I/O unit 112 interconnected via a local bus 128. Alternatively, a node 104 may comprise a memory unit 116. Each node 104 connects to a IEEE 1394 carrier 120 via a respective bus connector 124.

Figure 2:
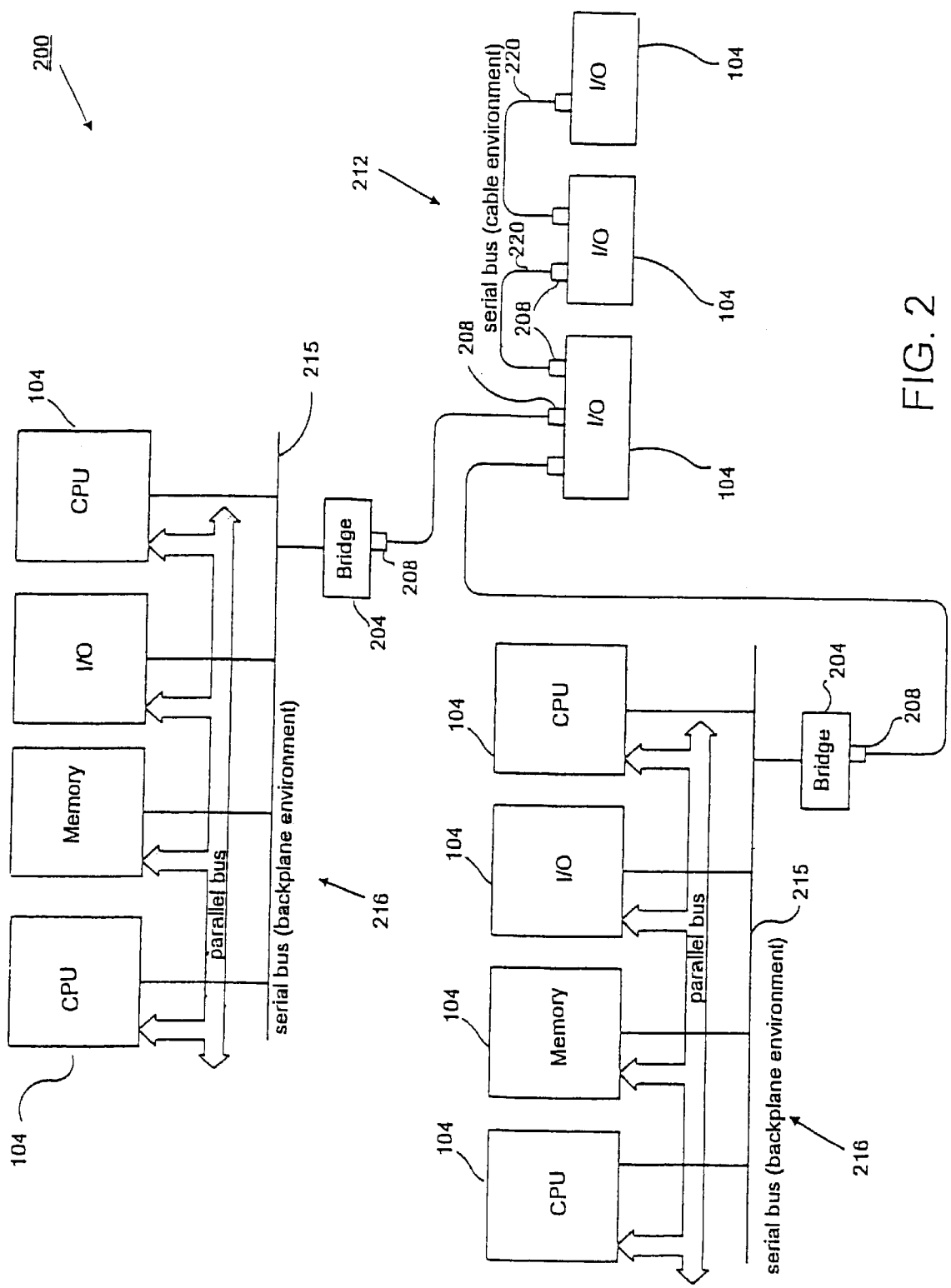
FIG. 2 depicts a exemplary IEEE 1394 network topology.

FIG. 2 depicts exemplary IEEE 1394 physical network topology 200, which comprises two IEEE 1394 "backplane environments" 216 respectively bridged to a IEEE 1394 "cable environment" 212.

In a backplane environment 216, the physical topology is a multidrop bus 215. The physical media includes two, single ended conductors that run the length of the backplane and have connectors distributed thereon for connecting a plurality of IEEE 1394 nodes 104.

In a cable environment 212, the physical topology is a "noncyclic" network (meaning that closed loops are not supported) with finite branches and extent. Respective IEEE 1394 cables 220 connect together ports 208 on different nodes 104. Each port 208 typically comprises terminators, transceivers, and arbitration logic circuitry (not shown). The cables 220 and ports 208 function, in part, as cable repeaters, which repeat signals incident thereon to an adjacent node 104. This repeating feature allows nodes 104 in the cable environment 212 to simulate a single, logical bus. When two differing IEEE 1394 buses are connected together, e.g., in a backplane environment 216 or in a cable environment 212, a bridge 204 is used to convert communications between the different network environments.

In accordance with the IEEE 1394 standard, a sixty-four bit addressing scheme is employed by the IEEE 1394 network 200. The upper sixteen bits of each address represent the "node_ID". The most significant ten bits of the node_ID identify the particular logical bus or "bus_ID" (e.g., bus 215) in the overall IEEE 1394 network 200. Thus, up to one thousand twenty three buses can be employed in the IEEE 1394 network 200. The next most significant six bits of the node_ID represent a particular node's physical address or "physical_ID". Sixty-three independently addressable nodes (e.g., nodes 104) can reside on a particular IEEE 1394 bus (e.g., bus 215). Various portions of the remaining forty-eight bits of address space are allocated for specific resources, either to a particular bus, or a particular node.

Figure 3:
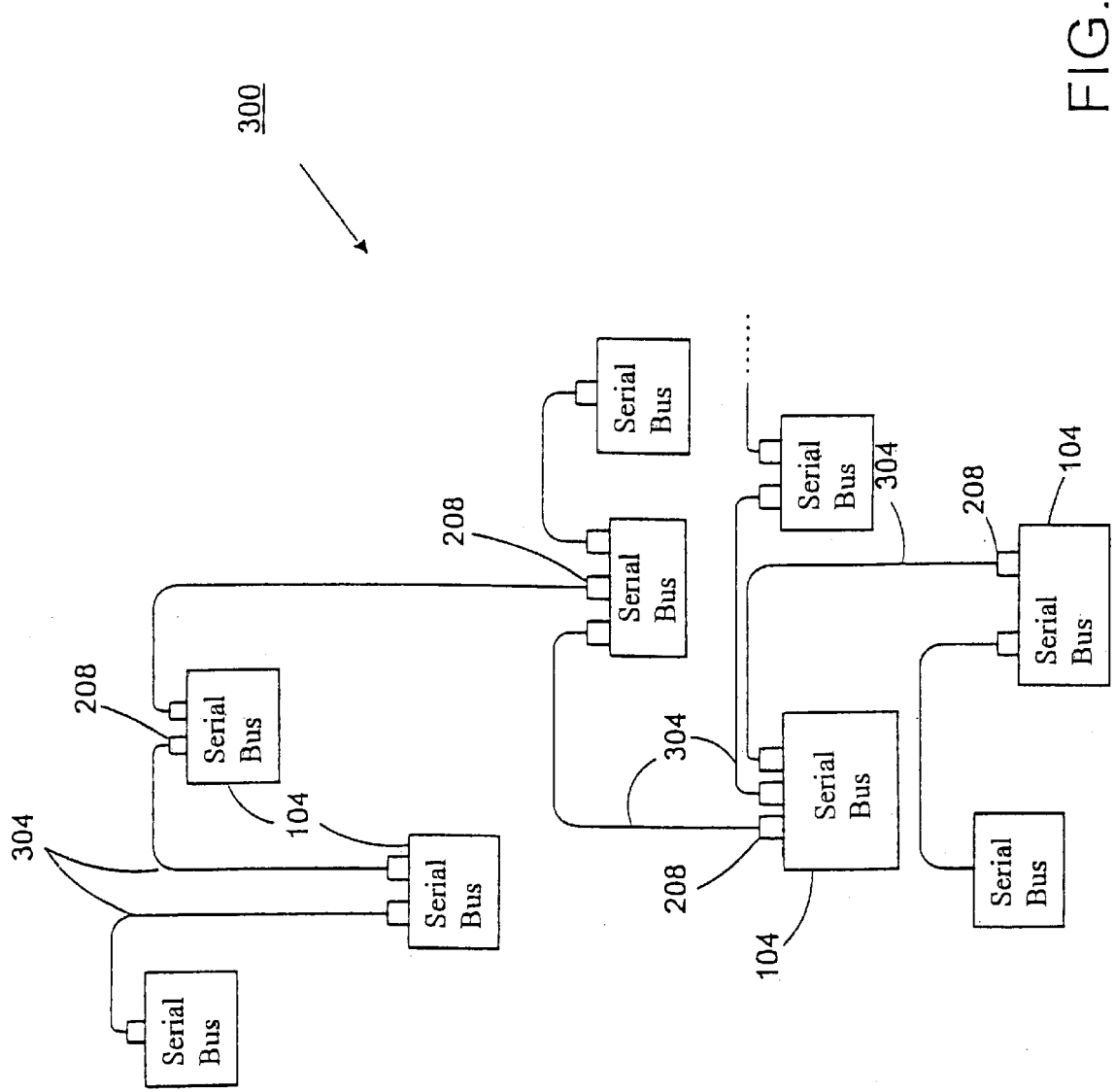
FIG. 3 depicts an exemplary cable-based IEEE 1394 topology.

FIG. 3 depicts an exemplary IEEE 1394 cable topology 300. In accordance with this configuration, a number of nodes 104 are "daisy-chained" together between ports 208 by respective IEEE 1394 cables 304. Each node 104 acts as a repeater, repeating signals between one port 208 to the next port so they can be transmitted over the cables 304 between the respective nodes 104.

Figure 4:
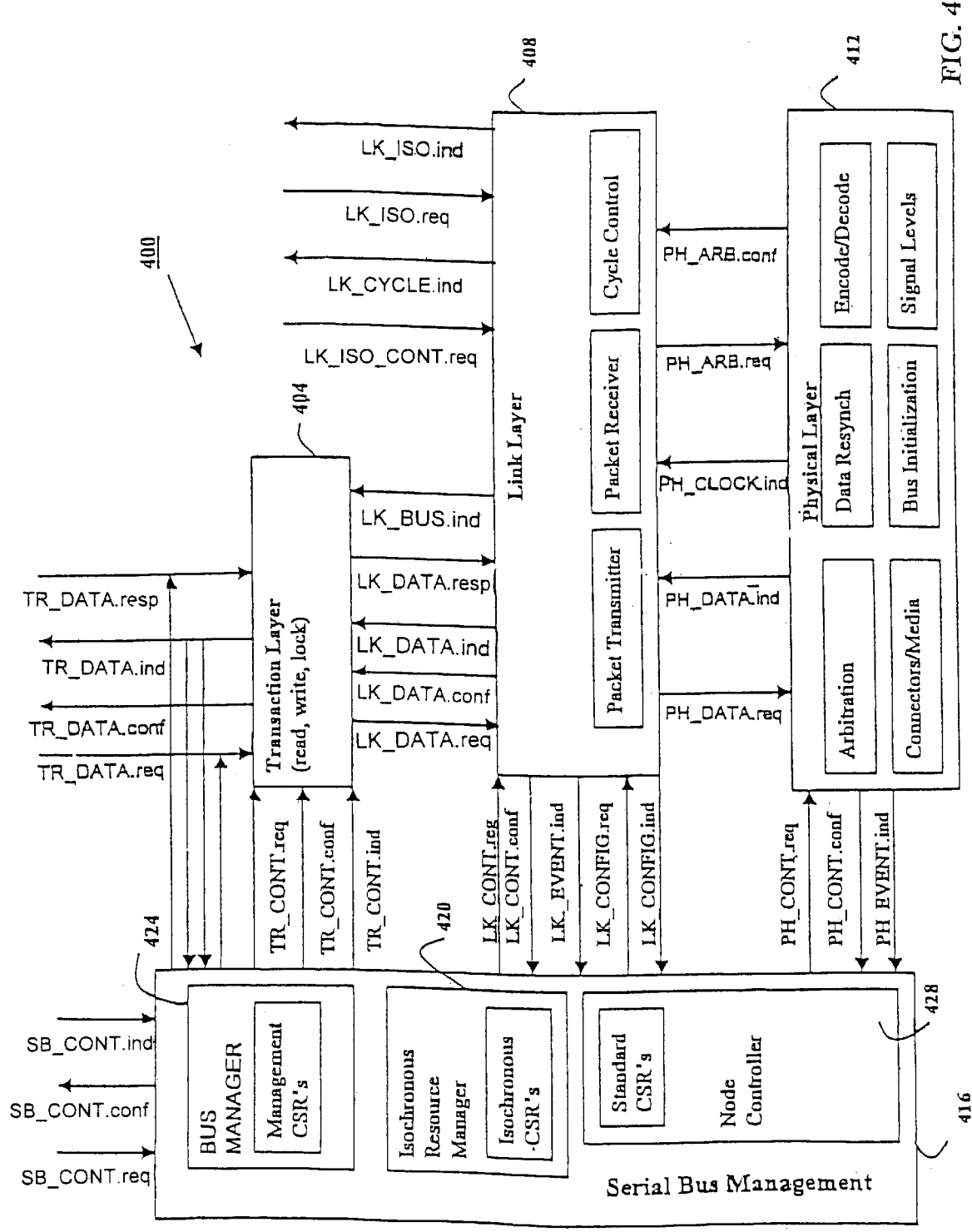
FIG. 4 depicts an exemplary IEEE 1394 node protocol stack.

FIG. 4 depicts a protocol stack 400 illustrating the relationships between the hardware and software components within an exemplary IEEE 1394 node 104. In particular, four layers are depicted in the protocol stack 400: transaction layer 404, link layer 408, physical layer 412, and serial bus management layer 416. Additional layers (not shown), such as an application layer, may also be included in the protocol stack 400.

In particular, the transaction layer 404 defines a complete request-response protocol to perform bus transactions to support read, write and lock operations. The transaction layer 404 also provides a path for isochronous management data to get to the serial bus management layer 416.

The link layer 408 provides for one-way data transfer with confirmation of request (i.e., an "acknowledged datagram") service to the transaction layer 404. More particularly, the link layer 408 provides addressing, data checking and data framing for packet transmission and reception, and also provides an isochronous data transfer service directly to the application. This includes generation of timing and synchronization signals (e.g., a "cycle signal").

The physical layer 412 translates logical symbols used by link layer 408 into electrical signals for output onto a IEEE 1394 cable. The physical layer 412 also provides an arbitration service to ensure that only one node at a time is sending data. In a preferred embodiment, the physical layer 412 provides data resynch and repeat service, as well as automatic bus initialization.

The serial bus management layer 416 provides bus management, isochronous resource management and node control. For example, in the cable environment 212 of FIG. 2, the serial bus management layer's 416 isochronous resource manager 420 grants the resources necessary for the respective nodes 104 to allocate and deallocate cooperatively the isochronous resources, channels and bandwidth necessary for efficient and orderly isochronous operations.

A bus manager 424 provides services, such as performance optimization, power and speed management and topology management to other nodes, 104 on the bus. Finally, a node controller 428 manages all control and status registers needed by the nodes 104 on the bus, and communicates with the physical layer 412, the link layer 408, the transaction layer 404 and one or more other application layers (not shown).

HOME ENTERTAINMENT AND HOME OFFICE SYSTEM

Figure 5:
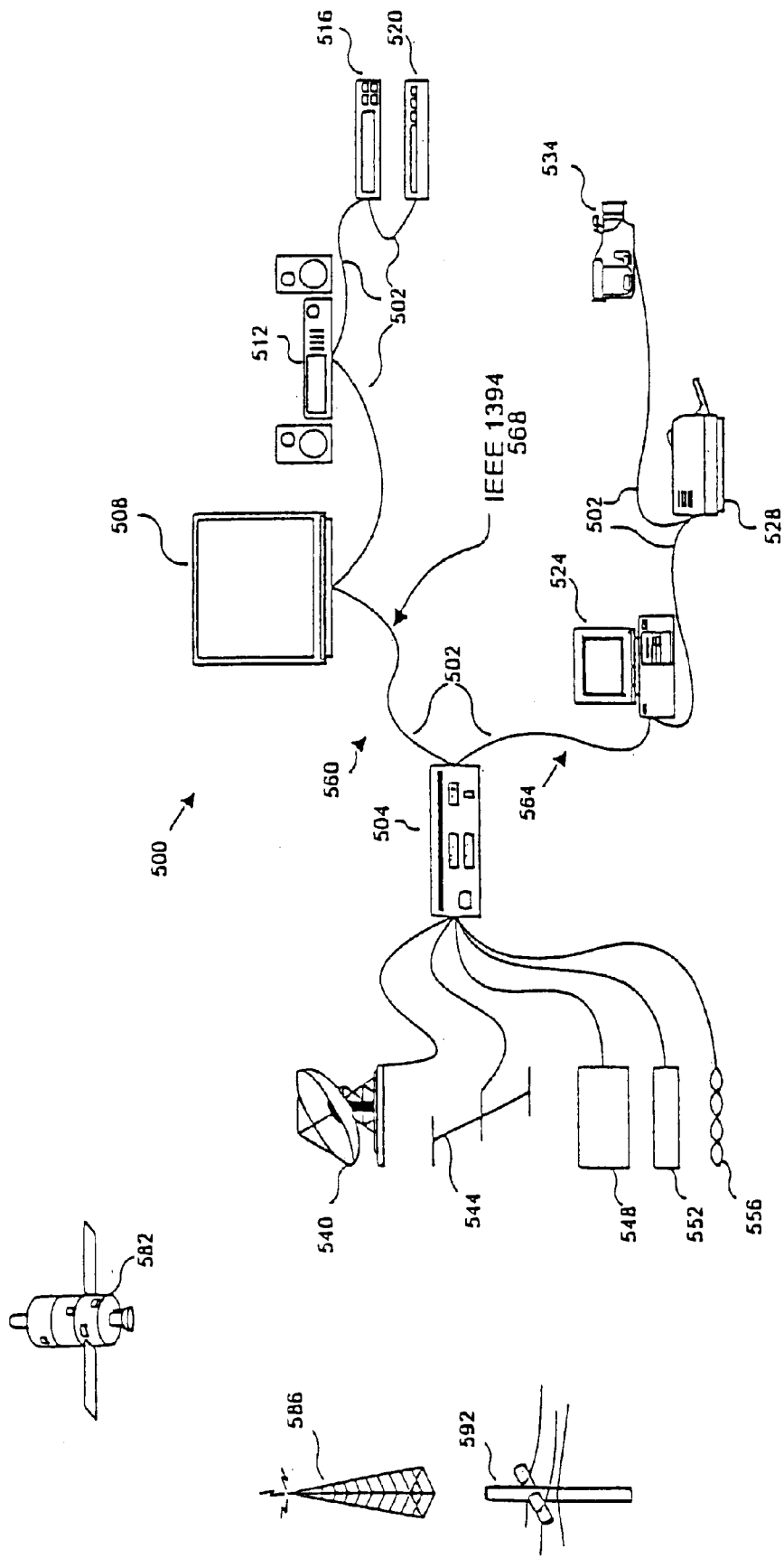
FIG. 5 depicts a home gateway bridging multiple external service providers with a IEEE 1394-based network.

FIG. 5 depicts a home gateway 504 bridging multiple external service providers to a preferred home entertainment and home office system network, referred hereafter as "home entertainment system network" 500. The home entertainment system network 500 is connected by an IEEE 1394 bus 568, which is preferably configured in a cable environment (described above with reference to FIGS. 2–3). In particular, a series of daisy-chained, IEEE 1394 cables 502 interconnect between ports of various electronics components of the home entertainment system 500 to form the IEEE 1394 bus 568. For example, a TV 508, a stereo 512, a VCR 516 and a DVD 520 are connected in one chain 560. In another chain 564, a personal computer 524, a printer 528, and a digital camera 534 are connected.

Each of the respective chains 560 and 564 of electronic components are connected to the home gateway 504, which acts as a bridge between one or more external networks and the respective internal network chains 560 and 564. (i.e., as opposed to a bridge between two different bus environments). For example, the home gateway 504 is capable of receiving media feeds from a satellite 582 via a satellite receiver 540, a broadcast tower 586 via an antenna 544, as well as feeds from local land lines 592 (e.g. copper twisted pair, coaxial or fiber optic cable) via a coaxial cable receiver 548, fiber optic cable receiver 552, or telephone cable receiver 556, respectively. (Note: although the various receivers are shown outside of the home gateway 504, the actual receivers or receptacles can be contained within the home gateway 504 as well. They are shown outside of the home gateway 504 for illustration purposes only.)

The TV 508 preferably includes an internal television adapter that converts data from the IEEE 1394 bus 502 to NTSC (National Television Standards Committee) and/or ATSC (Advanced Television Systems Committee) video signals for presentation on the television screen. In an alternative preferred embodiment, the television adapter is an external device, which connects between the TV 508 and the IEEE 1394 cable 502. In either embodiment, the television adapter preferably includes an off-screen buffer, for image data not presently displayed, but to be displayed in the future, and an on-screen buffer, for image data presently displayed on the television screen. Furthermore, the television adapter can be incorporated into an auxiliary device connected to the television, such as a VCR, a DVD player, or a digital camera.

HOME GATEWAY

Figure 6:
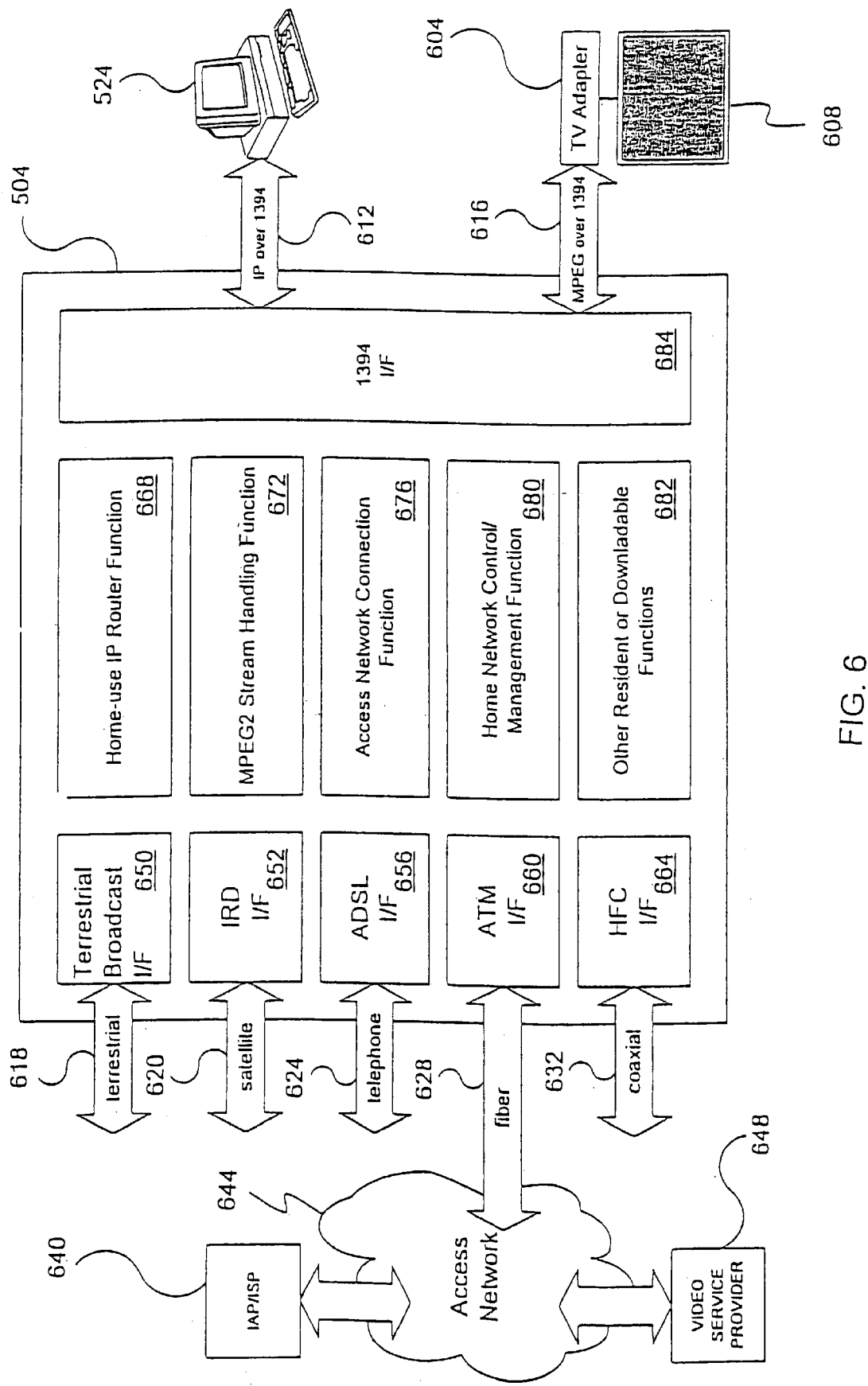
FIG. 6 is a functional block diagram of the home gateway of FIG. 5.

FIG. 6 depicts a functional block diagram for the home gateway 504, as well as for the components communicatively coupled to the home gateway 504.

The gateway 504 comprises one or more interfaces to communicate over an access network 644 through which respective services are provided. For example, services from an internet access provider ("IAP") or internet service provider ("ISP") 640, or from a video service provider ("VSP") 648 can be provided by connecting the respective home gateway interface, e.g., wireless interface "Terrestrial Broadcast I/F" 650, "Satellite I/F" 652, asynchronous digital subscriber line interface "ADSL I/F" 656, asynchronous transfer mode interface "ATM I/F" 660, or hybrid fiber coaxial interface "HFC I/F" 664, to the access network 644 via an appropriate network link, (e.g., terrestrial link 618, satellite link 620, telephone link 624, fiber link 628, or coaxial link 632, respectively). According to one preferred embodiment, adapter slots on the home gateway 504 receive one or more of the above interfaces. Such an embodiment provides for a flexible reconfiguration when new or upgraded communications technologies/hardware are connected to the home entertainment system 500.

A variety of applications are possible over the access network 644 from either the LAP/ISP 640 and/or the VSP 648, such as internet surfing, MPEG video streams (standard and high definition television), network gaming, an electronic program guide "EPG", and home network control. Accordingly, the home gateway 504 includes hardware and software to enable home-user IP routing 668, MPEG2 stream handling (including on-screen display "OSD" and EPG processing) 672, access network communication control 676, home network control/management 680, and other resident or downloadable functions 682 such as gaming, home automation and directory services. To this end, the firmware stack for the home gateway 504 is described below with reference to FIG. 8. The protocol stacks for implementing the above referenced functions are described below with reference to FIGS. 9 through 12.

The 1394 interface 684 is a necessary component of the home gateway 504 and it is used in conjunction with the network protocols described with reference to FIGS. 9–12. The 1394 interface 684 acts as a bridge between the external network protocols and the IEEE 1394 compliant bus which forms the internal network. For example, the 1394 I/F 684 supports an IP over 1394 link 612 and an MPEG over 1394 link 616, between a personal computer 524 and a TV adapter 604 (which, in one embodiment, converts IEEE 1394 data into an analog or a digital signal for a television 608).

Figure 7:
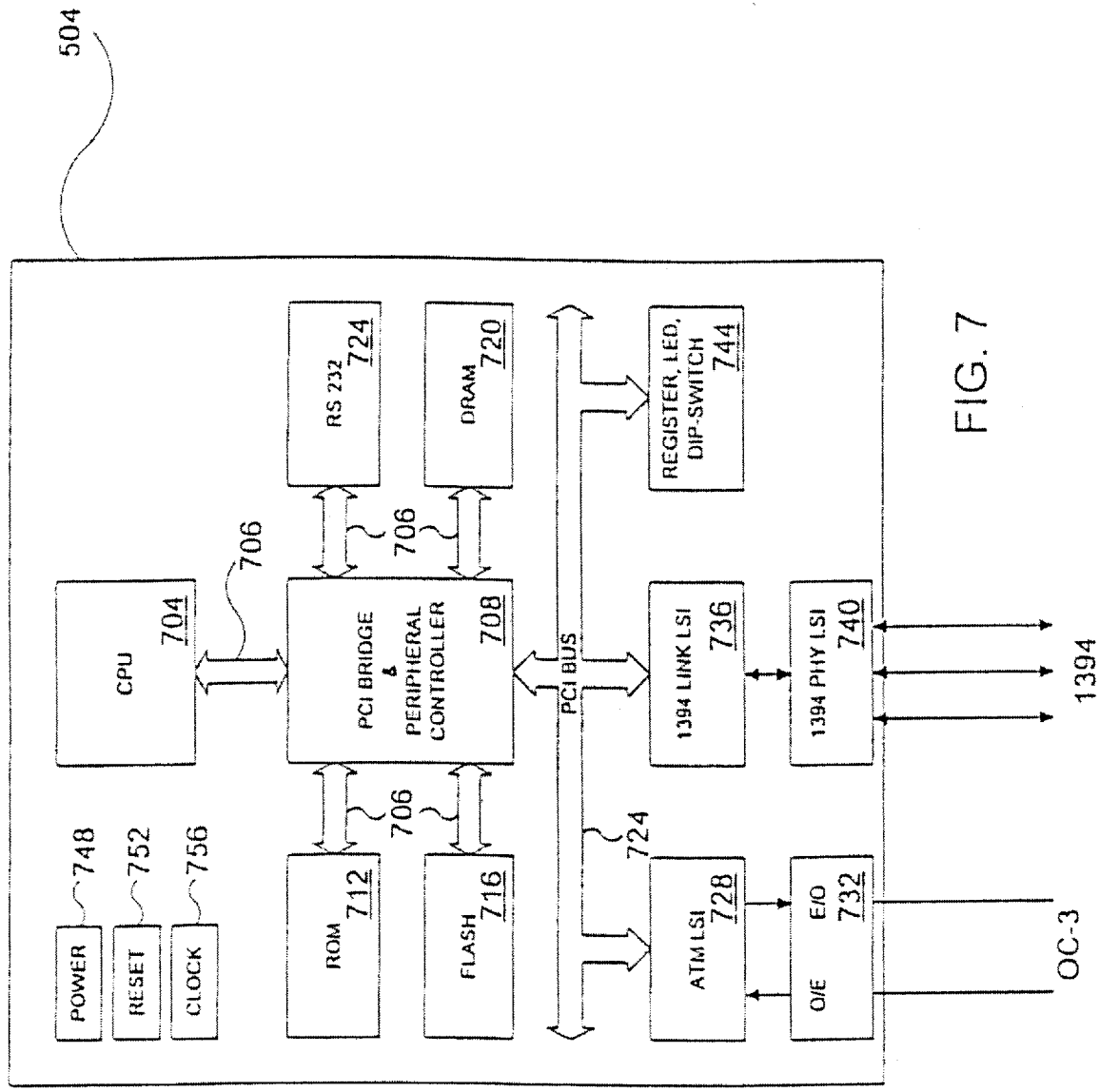
FIG. 7 is an alternate block diagram of the home gateway, illustrating hardware components.

As illustrated in FIG. 7, one embodiment of the home gateway 504 includes a power supply circuit 748, a reset circuit 752, a clock circuit 756, a central processing unit "CPU" 704, a local bus 706, a PCI bridge & peripheral controller 708, non-volatile memory (e.g., ROM 712 and FLASH 716), volatile memory (e.g., DRAM 720), an RS232 interconnect, and a PCI bus 724. Connected to the PCI bus 724 are an ATM LSI interface 728, which provides an ATM bridge and other functionality to the home gateway 504, a synchronous optical network ("SONET") interface 732, which connects to an optical carrier 3 ("OC-3") level port, a 1394 LINK LSI 736, a 1394 PHY LSI, with three IEEE 1394 ports, and a register, LED and dip-switch unit 744.

Off-the-shelf hardware components are preferably employed in the home gateway 504. For example, a presently preferred hardware component specification is set forth in Table 1. Where a particular manufacturer's product is preferred, it is specified.

TABLE 1

| | |
|---|---|
| CPU | NR4650 133MHz (NKK Micro Devices) |
| DRAM | 8 MB |
| ROM | 128 kB |
| FLASH | 4 MB |
| PCI Bridge & Peripheral Controller | NR4650-PSC (NKK Micro Devices) |
| 1394 LINK LSI | MD8411 (Fuji Film Micro Device) |
| 1394 PHY LSI | MD8401 (Fuji Film Micro Device) |
| ATM LSI | LASAR-155 (PMC-Sierra) |
| Internal Bus | PCI |

The CPU 704, ROM 712, FLASH 716, RS232 724 and DRAM 720 are communicatively coupled to each other via PCI bridge & peripheral controller 708 and local bus 706. The PCI bridge & peripheral controller 708 is also connected to the PCI bus 724. The PCI bus 724 is, in turn, connected to the ATM LSI 728, the 1394 LINK LSI 736 and register, LED and dip-switch unit 744.

Figure 8:
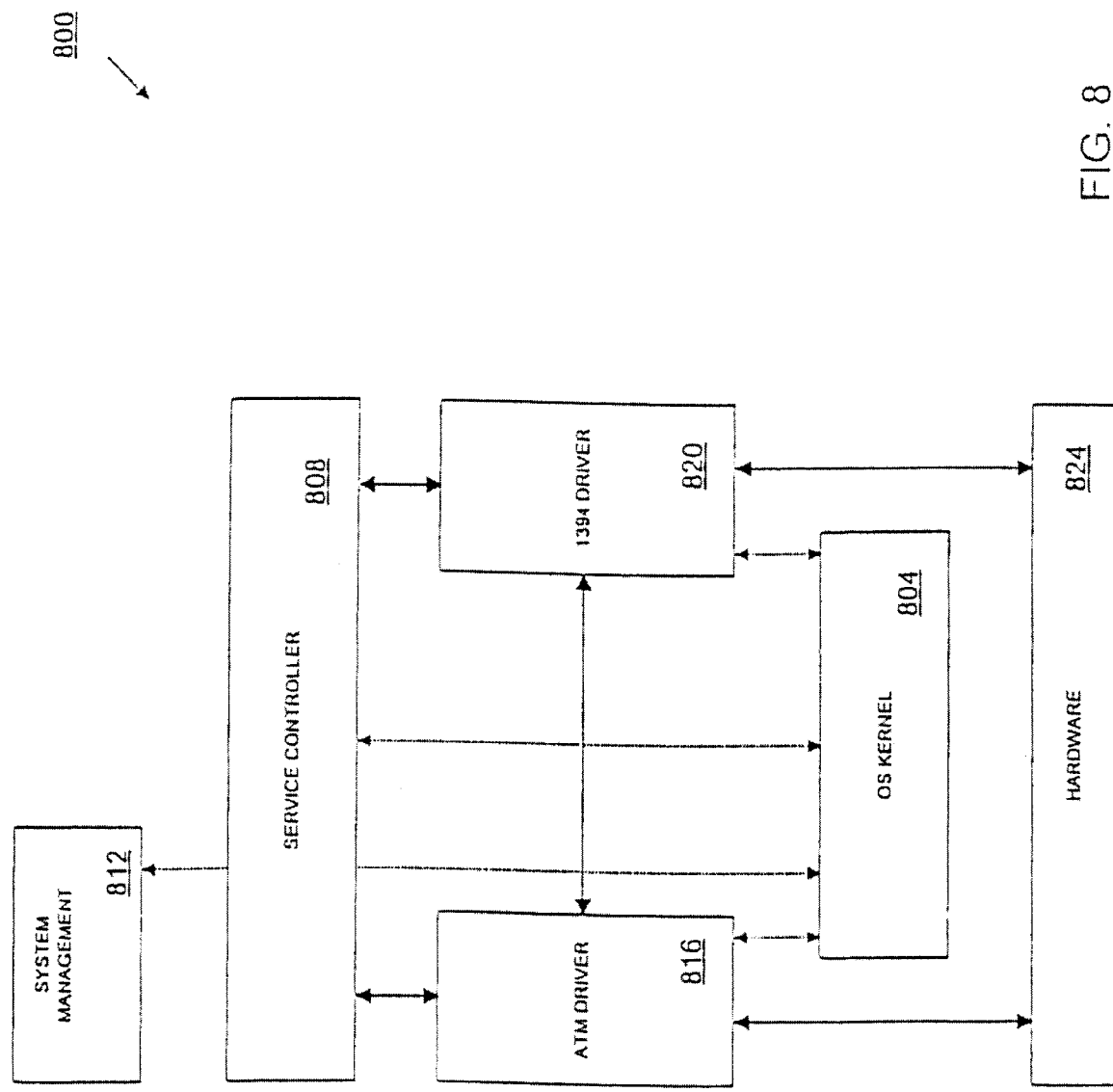
FIG. 8 is block diagram illustrating a firmware stack for the home gateway.

FIG. 8 depicts a firmware stack 800, employed by the home gateway 504. An operating system (OS) kernel 804 resides at the core of the firmware stack 800, and communicates with a service controller 808, system management 812, ATM driver 816 and 1394 driver 820. The ATM driver 816 communicates with the service controller 808, the 1394 driver 820 and various hardware components 824 (i.e., physical electronics components in the home entertainment system 500.). Similarly, the 1394 driver 820 communicates with the service controller 808, ATM driver 816 and hardware 824.

System management 812 includes functions for initialization, self-diagnostics, system health checking and debugging. Service controller 808 includes functions for MPEG TS and EPG filtering and multicasting, IP routing and terminal functions, MPEG over the 1394 bus and MPEG over ATM, as well as IP over 1394 bus and IP over ATM, address mapping, home network service command and control (e.g., MPEG service control, TV image control, remote handling, and camera control), and other functions (e.g., gaming, home automation, and directory services)

The 1394 driver 820 realizes asynchronous data transmission, isochronous data transmission, physical layer control packet transmission, bus reset and control, root and cycle master processing, configuration status register and configuration ROM handling, bus management and address mapping table updates, whereas the ATM driver 816 realizes ATM pack transmission and ATM permanent virtual connection ("PVC") establishment and release.

The OS kernel 804 provides for task switching, message queue and delivery, interrupt handling, timer management and memory management. Also, the OS kernel 804 provides the electronic device interoperability functions which are used to control home gateway 504.

The hardware 824 represents the physical layer, or lowest layer, of the firmware stack 800.

PROTOCOL STACKS

Figure 9:
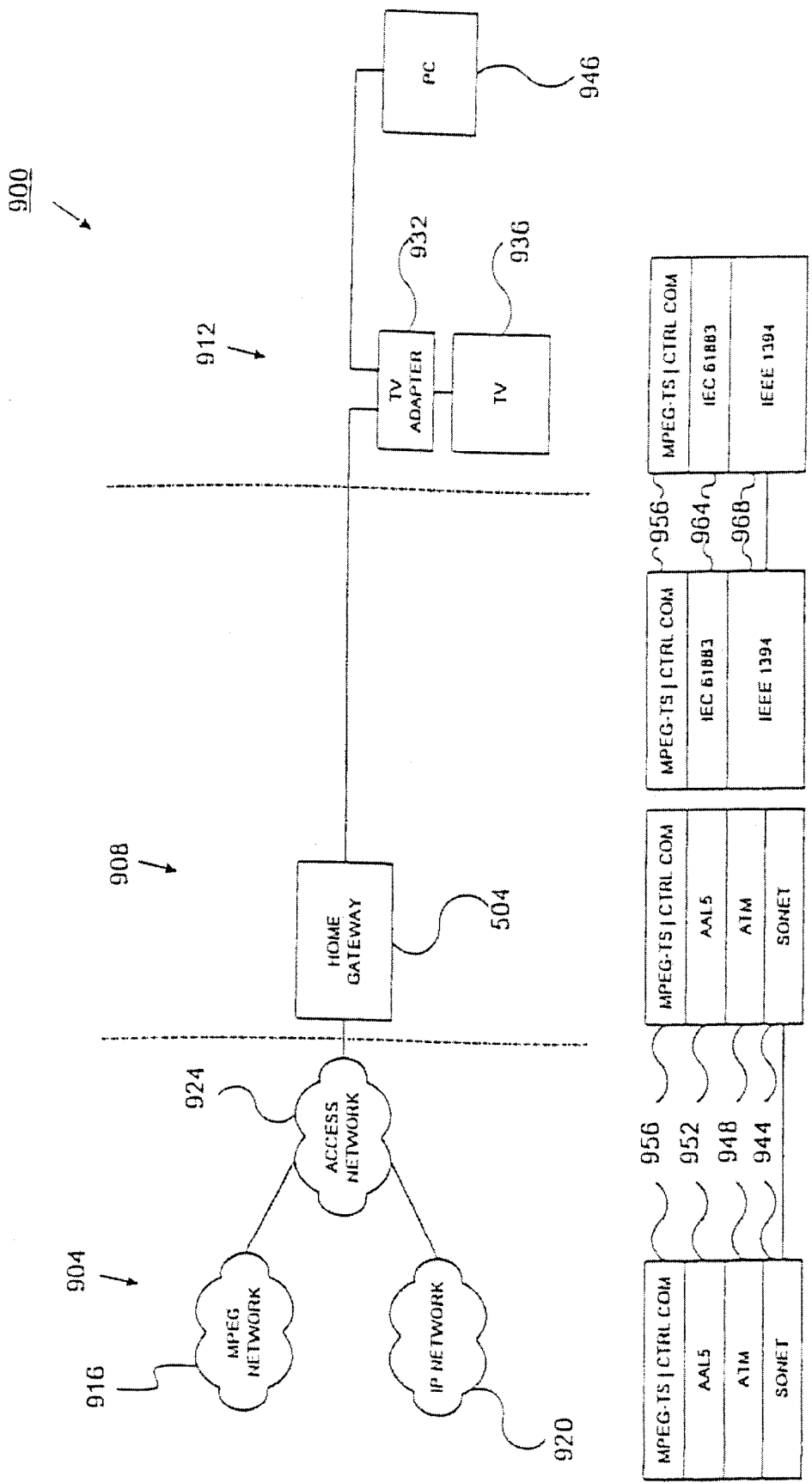
FIG. 9 depicts a protocol stack for MPEG transport over the IEEE 1394-based home entertainment system network of FIG. 5.
Figure 10:
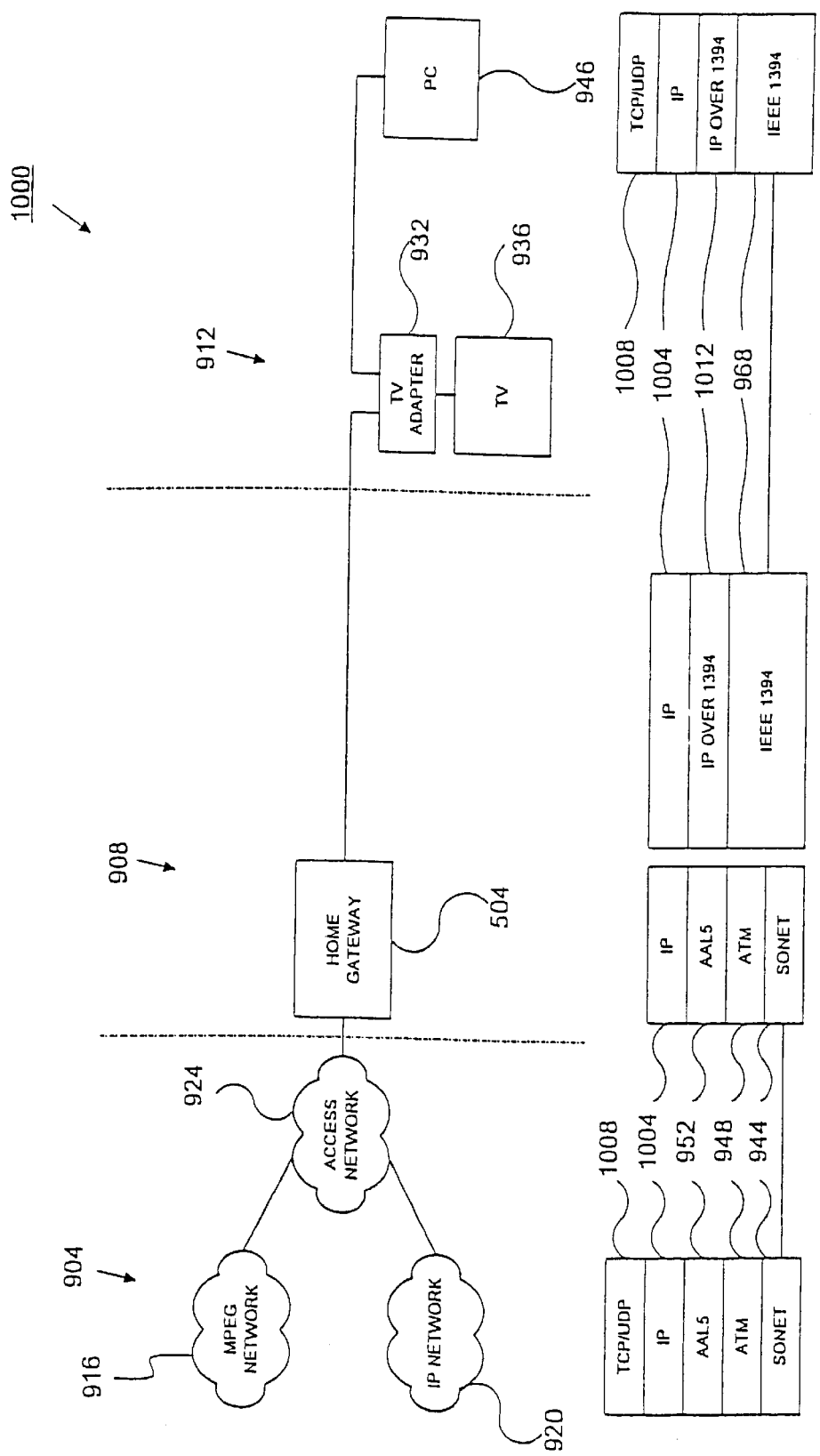
FIG. 10 depicts a protocol stack for IP routing over the home entertainment system network of FIG. 5.
Figure 11:
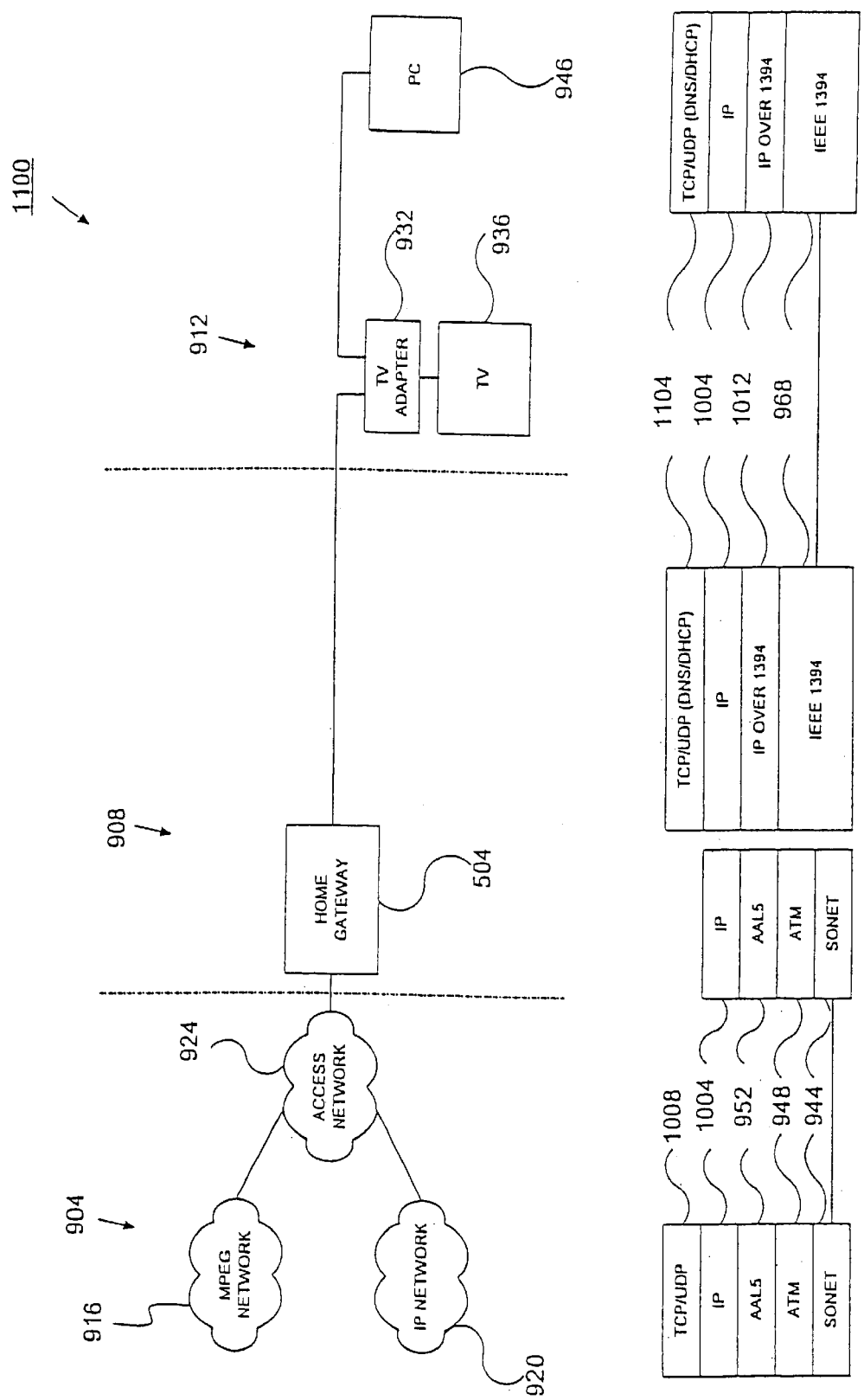
FIG. 11 depicts a protocol stack for IP plug-and-play and DNS/DHCP routing over the home entertainment system network of FIG. 5.
Figure 12:
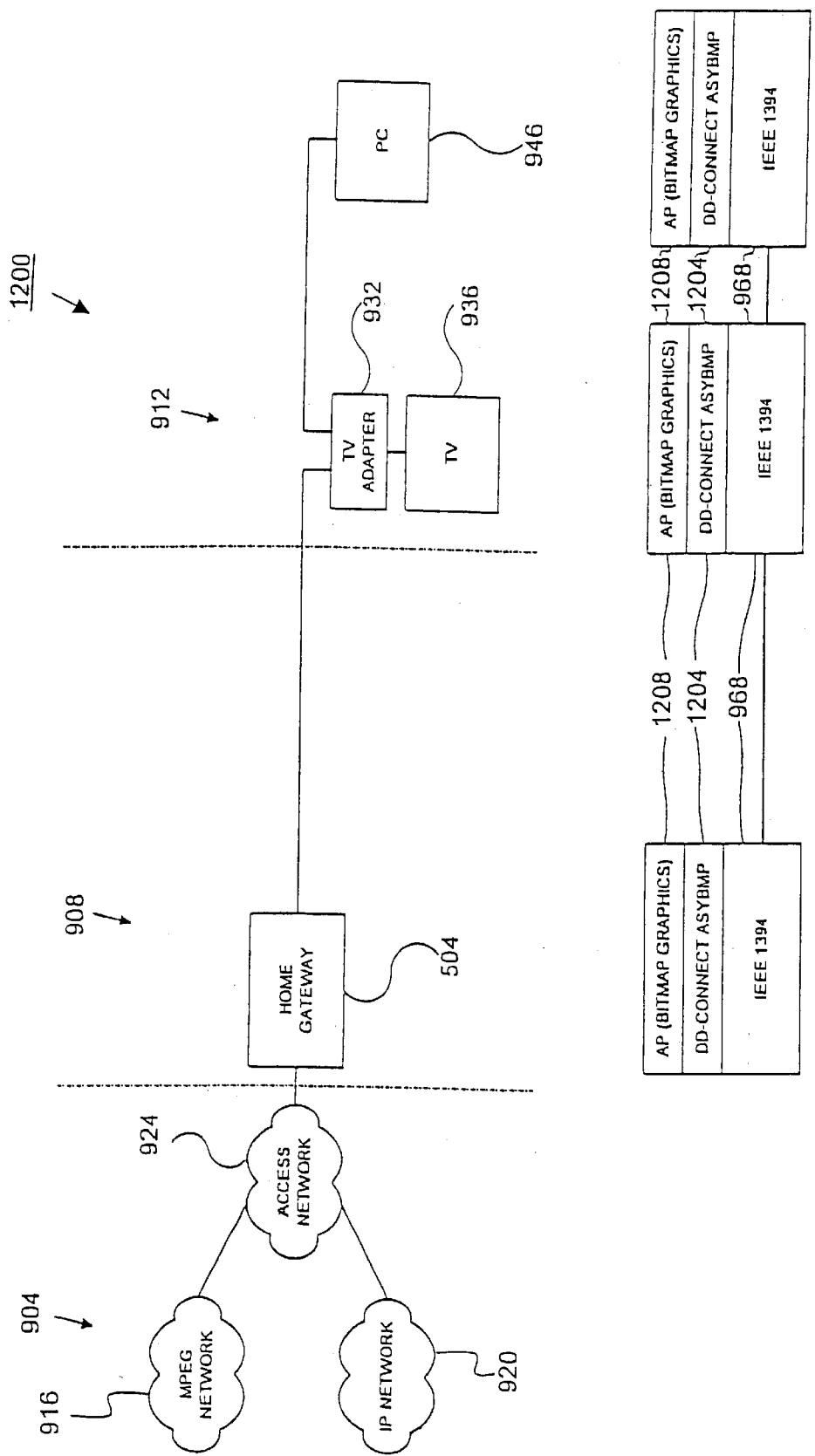
FIG. 12 depicts a protocol stack for bitmap display data transfer between devices of the home entertainment system of FIG. 5.
Figure 13:
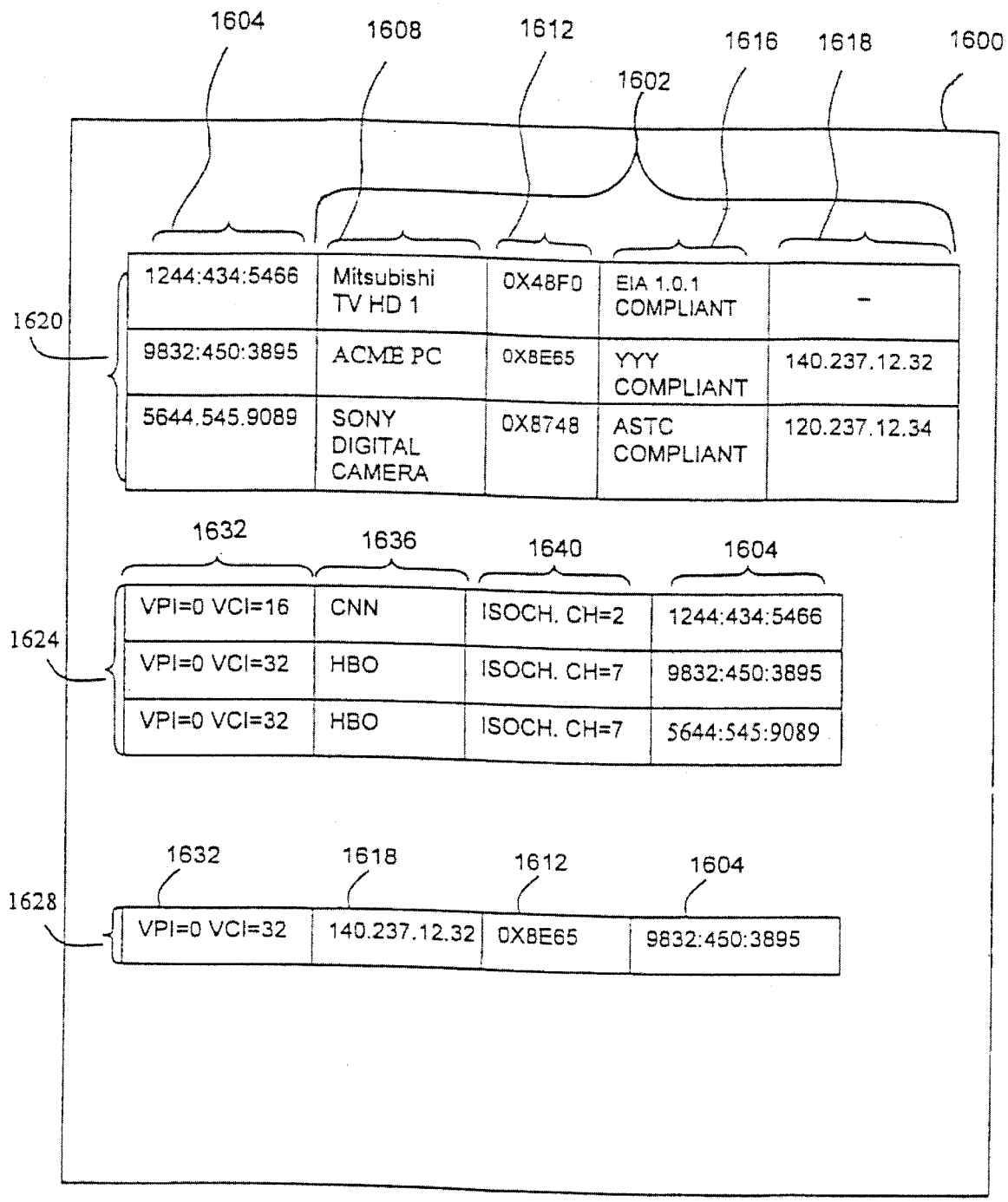
FIG. 13 depicts an address mapping table.
Figure 14:
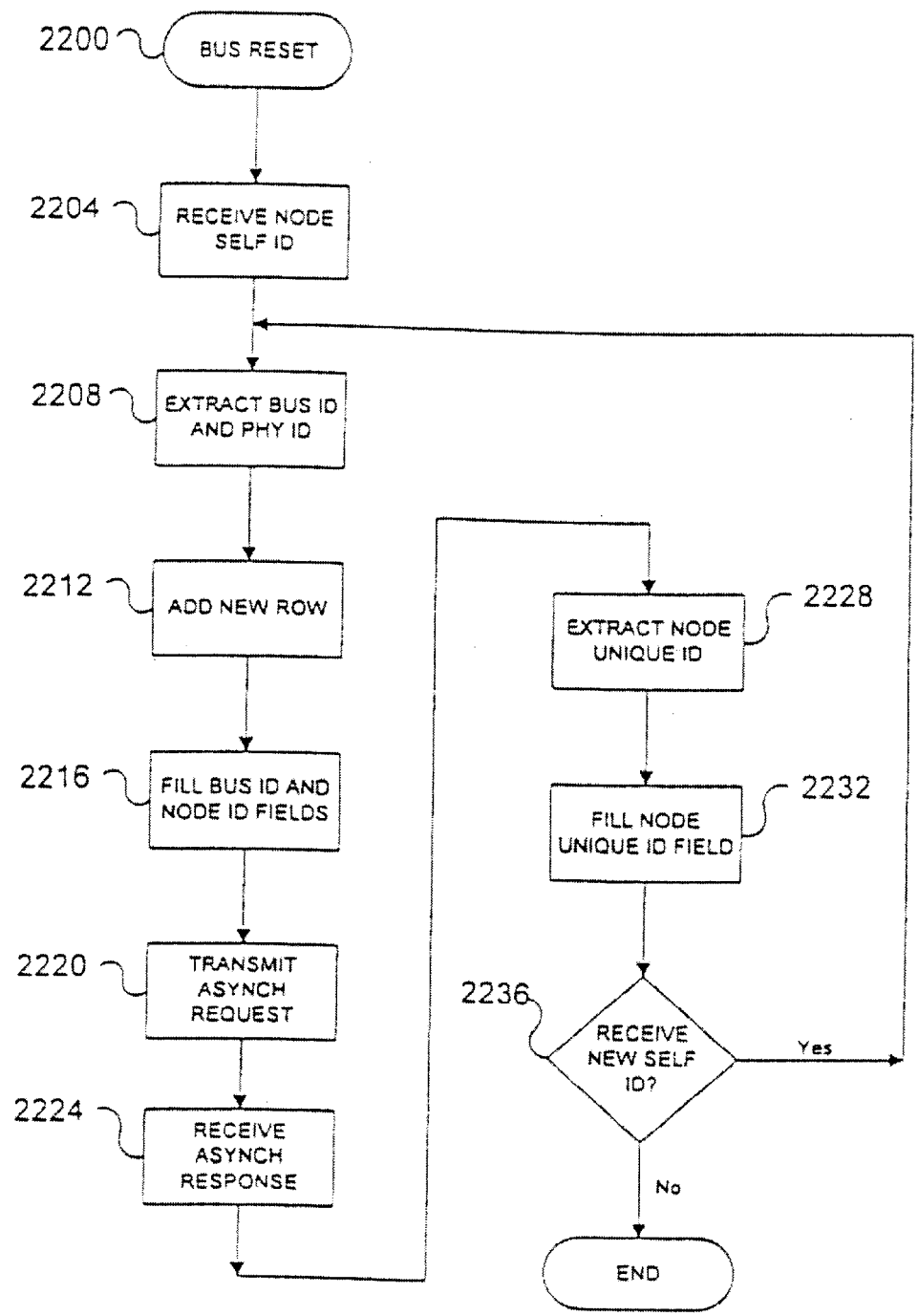
FIG. 14 is a flowchart depicting the acts for generating and maintaining an address mapping table.

FIGS. 9 through 12 depict various aspects of the protocol stacks employed between the respective external networks, the home gateway and the internal network(s), which pertain to the home entertainment system network. FIGS. 9–11 pertain to the home gateway 504. FIG. 12 pertains to the protocol stack between home electronic devices located on the home entertainment system network.

Commonly shown in FIGS. 9–12 is an external network 904, a bridge 908, and an internal network (i.e., IEEE 1394 bus) 912. The external network 904 can comprise an MPEG network 916 (e.g., a digital video service provider), and an IP network 920 (e.g., the "Internet"). An access network 924 connects to both the MPEG network 916 and IP network 920. According to one embodiment, the access network 924 is an internet access provider ("LAP") such as, e.g., America Online or @Home. The external network 904 is coupled to the internal network 912 through a bridge 908. The bridge 908 is preferably an home gateway 504. The home gateway 504 converts data and signals from the external network 924 from ATM packets to an IEEE 1394 format, which can be forwarded to the internal network 912. The internal network 912 comprises a television adapter 932 and a standard or high definition television 936 (or alternatively a single unit incorporating a 1394 node and a television) and a personal computer 946. The protocol stacks are depicted in FIGS. 9–12 under the portion of the overall system to which they correspond.

FIG. 9 depicts the protocol stack 900 according to ATM data transmission from an MPEG network 916 to a TV adapter 932.

MPEG data is formatted at the MPEG network 916 from MPEG TS ("transport stream") protocol or control command ("CTRL COM") 956 to ATM adaption layer 5 ("AAL5") 952. From AAL5, the data is converted to ATM data 948, and from ATM 948 it is converted to synchronous optical network "SONET" protocol 944. An ATM network is preferred at the lowest layer, given its high reliability, but in alternative embodiments, a different carrier can be employed (e.g., by replacing the ATM layers).

From the access network 924, data is received at the home gateway 504. At the home gateway 504, the communications from the external network are converted (or "bridged") from an ATM protocol to an IEEE 1394 protocol. Additional protocol layer conversions are shown in FIG. 9, including IEC 61883 964, which formats MPEG data for IEEE 1394 communication and is further described in International Electrotechnical Commission Standard 61883 entitled "Digital Interface for Consumer Audio/Visual Equipment" and which is publicly available from the IEC (www.iec.org). IEEE 1394 protocol 968, is described in the IEEE 1394-1995 standard.

From the gateway 908, data is sent via IEEE 1394 protocol to the internal network 912, where it is subsequently converted back into an MPEG transport stream for presentation/playback on a video display unit. It is further possible with TV adapter 932 to convert the data to an analog signal cable of providing audio/visual data to a standard or high definition television set. Preferably, however, TV 936 is capable of supporting MPEG data.

FIG. 10 depicts a protocol stack 1000 according to IP data transmission from IP network 9to PC 946. The transmission control protocol ("TCP") or user datagram protocol ("UDP") 1008, which are described in publicly available documents Internet RFC 793 and Internet RFC 768 respectively, are layered over internet protocol ("IP") 1004, which is described in Internet RFC 791. This facilitates transmission of packet data from an internet (e.g., the Internet or World-Wide Web). At the home gateway 504 and PC 946, an IP over 1394 protocol 1012, described in Internet Engineering Task Force ("IETF") document "IPv4 over IEEE 1394", by Peter Johansson and available at <http://www.ietf.org>, is employed. The IETF document "Ipv4 over IEEE 1394" is incorporated herein by reference in its entirety. The protocol stack 1000 is especially advantageous for finding or exploring content on the World-Wide Web and Internet.

FIG. 11 illustrates a protocol stack 1100 for TCP/IP data transmission from the IP network 920 to the PC 946. In order to facilitate automatic setup and IP address assignments, the protocol stack 1100 supports a domain name system ("DNS"), as described in Internet RFCs 1034 and 1035, and dynamic host configuration protocol ("DHCP").

FIG. 12 illustrates a protocol stack 1200 for bitmap transfer between devices (e.g., from the home gateway 504 or PC 946 to the TV adapter 932) over the internal network 912. The protocol stack 1200 employs additional and previously non-described protocol "DD-Connect AsyBmp" 1204. The "bitmap transfer" protocol is described in U.S. application Ser. No. 09/302,022 entitled "BITMAP TRANSFER", which has been incorporated herein by reference in its entirety. The "AP" protocol 1208 is simply the particular protocol used at the application layer (e.g., a display protocol or a mouse protocol).

ADDRESS MAPPING

FIG. 16 depicts an exemplary address mapping table 1600. The address mapping table 1600 preferably comprises at least four columns and as many rows as there are devices on the home entertainment network 500. The address mapping table 1600 is preferably partitioned into three distinct sections. The first section 1620 comprises IEEE 1394 service data, the second section 1624 comprises MPEG service data, and a third section 1628 comprises IP service data. Each section has its own "mini-table" for information, although the address mapping table 1600 is physically a single table.

In the IEEE 1394 section 1620, the first column is the node unique ID column 1604, the node unique ID is permanently encoded into the hardware or ROM of the node 104. The next group of columns are node attribute columns 1602. The node attribute columns include a common name column 1608, which identifies a particular node by a user selected/programmed name that is stored in the node, a node_ID column 1612, which contains a dynamically assigned 16-bit node_ID, a node type column 1616, and an IP address column 1618.

In the MPEG service section 1624, the first column is the ATM VPI/VCI column 1632, the next column is the MPEG information column 1636, the third column is the isochronous channel column 1640 and the last column is the node unique ID column 1604.

In the IP service section 1628, the first column is the ATM VPI/VCI column 1632, the next column is the IP address column 1618, the third column is the node_ID column 1612, and the last column is the node unique ID column 1604.

The address mapping table 1600 is created by the IEEE 1394 driver (e.g., IEEE 1394 driver 816 shown in FIG. 8) when a bus reset occurs. The IEEE 1394 driver receives a response from each node in the IEEE 1394 bus (e.g., IEEE 1394 bus 568 shown in FIG. 5) identifying the node's node unique ID and other information. Based on the information received from the node, the IEEE 1394 driver adds the node unique ID to the address mapping table 1600 and then queries the particular node for additional information (e.g., common name, node capabilities and IP address). The IEEE 1394 driver assigns a valve to node_ID column 1612 for the node.

FIG. 22 is a flowchart depicting the acts for generating and maintaining the address mapping table 1600. The acts are performed by a "managing node" residing on the home entertainment network system 500 and, more preferably, the acts are performed by the home gateway 504. The node managing the address mapping table 1600 is generally pre-selected. However, it can be dynamically changed either in response to a bus reset, or by express instruction from a user. In either event, the functionality for generating and maintaining the address mapping table 1600 is embedded into the IEEE 1394 driver 820.

At the outset of the address mapping process, a trigger is received which causes the address mapping table 1600 to be generated. The trigger is either an internal or external trigger, relative to the managing node, such as a bus reset command. The bus reset can occur as a result of an explicit instruction from the application layer, or by an implicit instruction from the firmware—such as in response to the IEEE 1394 driver 820 detecting a new node added to the home entertainment network system 500. The trigger is shown as a bus reset in FIG. 22, act 2200.

After receiving a trigger, the processing continues to act 2204, where a selfidentification packet is receiving by the managing node. The self-identification packet comprises sixteen-bit address information referred to above as a "node_ID". The node_ID, more particularly the ten-bit bus_ID and the six-bit physical_ID, is extracted from the self-identification packet at act 2208.

In act 2212, a new row is added to the address mapping table 1600. The data extracted at act 2208 is filled into the bus_ID and physical_ID fields in act 2216. In a preferred embodiment, the two fields are a single sixteen-bit address space—i.e., the node_ID column 1612.

In act 2220, the managing node prepares and transmits an asynchronous read request addressed to the node identified by the node_ID received at act 2204. In response to the asynchronous read request, the managing node receives an asynchronous read response at act 2224. The asynchronous read response comprises at least a node unique identifier ("ID") and preferably also comprises additional node attribute information, such as an IP address, a node type, and a common name.

In act 2228, the node unique ID and, according to a presently preferred embodiment, the additional node attribute information, are extracted from the asynchronous read response received at act 2224. In act 2232, the node unique ID is filled into the node unique ID column of the address mapping table 1600. In a preferred embodiment, the additional node attribute information is also filled into a corresponding column of the address mapping table 1600. In the event that a partitioned address mapping table 1600 is used, the rows of the address mapping table 1600 are logically separated corresponding to the type of service the data in the row pertains to, for example, IEEE 1394 service, ATM service, or MPEG service. In such an embodiment, the node attribute information identifies which partition the node information corresponds to. In another embodiment, redundant data is stored in mini service tables within the primary address mapping table 1600.

Finally, in act 2236, a test is performed to determine whether any new node self-ID packets have been received by the managing node. If any new node self-ID packets have been received, then processing continues to step 2208. If no new node self-ID packets have been received, then processing ends.

In the broader spirit of the invention, the steps described above can be handled in a batch mode, wherein after a bus reset (i.e., act 2200),.a collection period elapses during which node self-ID packets are received and queued into a list in memory by the managing node. In such an embodiment, the processing of node self-IDs and the attainment of node unique IDs and node attribute information can be handled from the queued list in an incremental fashion. The test, therefore, in act 2236 becomes whether any additional self-ID packets need to be processed.

When a command directed toward a particular node in the home entertainment network system 500 is received, the command is related to the particular bus_ID and a physical_ID (or node_ID) using the address mapping table 1600. The managing node then uses the particular bus_ID and physical ID to address (or direct) the received command to a particular node in the home entertainment network system 500.

The methods and processes described herein are preferably performed by one or more processors executing one or more sequence of instructions stored on a computer-readable medium, such as a persistent disk, a CD-ROM, a floppy disk, a volatile memory (e.g., random access memory "RAM"), or a non-volatile memory (such as a flash memory or read-only memory "ROM"), rather than in a particular hardware arrangement. However, in the broader spirit of the inventions, various aspects of the methods and processes described herein can be implemented via hardware components such as TTL logic, or gate arrays. Furthermore, if a preference for a firmware level, e.g., a lower level programmic implementation of software component that is, generally, stored in ROM, or an application level, e.g., a higher level programmic implementation of a software component that runs over firmware, an operating system kernel, and/or server processes, software component is desired, then that preference is specified. If no preference is specified, then either level of implementation is acceptable. Accordingly, the written description and accompanying figures contained herein are to be regarded in an illustrative, rather than a restrictive sense.

What is claimed is:

1. A method for address mapping in a network system, comprising:
   receiving a self identification packet;
   extracting a bus identifier and a physical identifier from the self identification packet;
   adding a new row to an address mapping tale, the new row comprising a bus identifier field, a physical identifier field, and a node unique identifier field;
   inserting the physical identifier and the bus identifier into the respective bus identifier field and physical identifier field in the new row of the address mapping table;
   transmitting a read request packet to a node identified by the self identification packet;
   receiving a read response packet, the read response packet comprising a node unique identifier;
   extracting one or more identifiers from the read response packet, the one or more identifiers including a node unique identifier; and
   inserting the one or more identifiers into additional fields in the new row of the address mapping table, and further comprising:
      partitioning a plurality of unique records into three or more logically distinct sections, the tree or more logically distinct sections including:
         an IEEE 1394 bus service section;
         an MPEG service section; and
         an IP service section.

2. The method of claim 1, the read response packet further comprising node attribute information, the method further comprising adding the node attribute information to one or more fields in the new row of the address mapping table.

3. The method of claim 1, further comprising:
   receiving a command pertaining to a particular node in the network system;
   relating the command to a particular bus identifier and physical identifier using the address mapping table; and
   sending the command to the particular node using the particular bus identifier and physical identifier.

4. The method of claim 1, wherein the transmitting and receiving acts are performed via an IEEE 1394 bus.

5. The method of claim 1, wherein the network system comprises a home entertainment system.

6. A computer readable medium having stored thereon sequences of instructions for causing one or more processors to perform the acts of:
   receiving a self identification packet;
   extracting a bus identifier and a physical identifier from the self identification packet;

adding a new row to an address mapping table, the new row comprising a bus identifier field, a physical identifier field, and a node unique identifier field;

inserting the physical identifier and the bus identifier into the respective bus identifier field and physical identifier field in the new row of the address mapping table;

transmitting a read request packet to a node identified by the self identification packet;

receiving a read response packet, The read response packet comprising a node unique identifier;

extracting one or more identifiers from the read response packet, the one or more identifiers including a node unique identifier; and inserting the one or more identifiers into additional fields in the new row of the address mapping table, and further comprising sequences of instruction for causing the one or more processors to perform the act of partitioning a plurality of unique records into three or more logically distinct sections, the three or more logically distinct sections including:

an IEEE 1394 bus service section;

an MPEG service section; and an IP service section.

7. The computer readable medium of claim 6, further comprising sequences of instruction for causing the one or more processors to perform the acts of:

receiving a command pertaining to a particular node in the network system;

relating the command to a particular bus identifier and physical identifier using the address mapping table; and sending the command to the particular node using the particular bus identifier and physical identifier.

8. The computer readable medium of claim 6, wherein the sequences of instructions cause the one or more processors to perform the acts of transmitting and receiving via an IEEE 1394 bus.

\* \* \* \* \*